US007794512B2

(12) United States Patent
Aradi et al.

(10) Patent No.: US 7,794,512 B2
(45) Date of Patent: Sep. 14, 2010

(54) SUPPLYING TUNGSTEN TO A COMBUSTION SYSTEM OR COMBUSTION SYSTEM EXHAUST STREAM CONTAINING IRON

(75) Inventors: Allen A. Aradi, Glen Allen, VA (US); Joseph W. Roos, Mechanicsville, VA (US); Dennis H. Rainear, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 548 days.

(21) Appl. No.: 11/687,253

(22) Filed: Mar. 16, 2007

(65) Prior Publication Data

US 2008/0223018 A1 Sep. 18, 2008

(51) Int. Cl.
*C10L 1/12* (2006.01)
*C10L 1/30* (2006.01)
(52) U.S. Cl. .............................. 44/354; 44/358; 44/361
(58) Field of Classification Search .................. 44/361, 44/354, 358
See application file for complete search history.

(56) References Cited

U.S. PATENT DOCUMENTS

| | | | |
|---|---|---|---|
| 2,511,028 A | 6/1950 | Whitman | |
| 2,606,924 A | 8/1952 | Whitman | |
| 2,606,925 A | 8/1952 | Whitman | |
| 2,606,928 A | 8/1952 | Barkdoll et al. | |
| 3,442,808 A | 5/1969 | Traise et al. | |
| 3,697,574 A | 10/1972 | Piasek et al. | |
| 3,914,307 A | 10/1975 | Massie | |
| 3,959,374 A | 5/1976 | Brennan et al. | |
| 4,144,181 A | 3/1979 | Elliott et al. | |
| 4,293,687 A | 10/1981 | Weissel et al. | |
| 4,340,689 A | 7/1982 | Joffrion | |
| 4,394,523 A | 7/1983 | Allen | |
| 4,448,995 A | 5/1984 | Allen | |
| 4,465,604 A | 8/1984 | King | |
| 4,587,329 A | 5/1986 | Tomalia et al. | |
| 4,647,386 A | 3/1987 | Jamison | |
| 4,670,515 A | 6/1987 | Oliver | |
| 4,737,550 A | 4/1988 | Tomalia | |
| 4,754,070 A | 6/1988 | Casey et al. | |
| 4,831,942 A * | 5/1989 | Morimoto et al. | ........... 110/345 |
| 4,948,842 A | 8/1990 | Oliver | |
| 5,075,383 A | 12/1991 | Migdal et al. | |
| 5,219,480 A | 6/1993 | Gutierrez et al. | |
| 5,259,968 A | 11/1993 | Emert et al. | |
| 5,439,607 A | 8/1995 | Patil | |
| 5,453,209 A | 9/1995 | Simon | |
| 5,578,237 A | 11/1996 | Emert et al. | |
| 5,693,106 A * | 12/1997 | Peter-Hoblyn et al. | ........ 44/301 |
| 6,107,258 A | 8/2000 | Esche et al. | |
| 6,117,825 A | 9/2000 | Liu et al. | |
| 6,488,725 B1 | 12/2002 | Vincent et al. | |
| 6,629,407 B2 | 10/2003 | Roos et al. | |
| 6,723,685 B2 | 4/2004 | Hartley et al. | |
| 6,821,932 B2 | 11/2004 | Guinther et al. | |
| 6,941,743 B2 | 9/2005 | Roos et al. | |
| 7,049,273 B2 | 5/2006 | Esche, Jr. et al. | |
| 2004/0105980 A1 | 6/2004 | Sudarshan et al. | |
| 2004/0214731 A1 | 10/2004 | Tynik | |
| 2004/0216824 A1 * | 11/2004 | Bley et al. | ............... 149/109.6 |
| 2005/0271566 A1 | 12/2005 | Yadav | |

FOREIGN PATENT DOCUMENTS

| | | |
|---|---|---|
| CN | 1560206 | 1/2005 |
| EP | 0256529 | 2/1988 |
| EP | 1493484 | 1/2005 |
| EP | 1889895 | 2/2008 |
| GB | 533017 | 5/1941 |
| GB | 1409921 | 10/1975 |
| JP | 2004204185 A | 7/2004 |
| WO | WO 9611997 | 4/1996 |
| WO | WO 9966011 | 12/1999 |
| WO | WO 2007/009022 | 1/2007 |
| WO | WO 2007009022 | 1/2007 |

OTHER PUBLICATIONS

Extended European Search Report; European Application No. 07 150 013.6-1213/1970429; Dec. 19, 2008.

* cited by examiner

*Primary Examiner*—Cephia D Toomer
(74) *Attorney, Agent, or Firm*—Thomas, Karceski, Raring & Teague, P.C.

(57) ABSTRACT

The present invention relates to an apparatus and method for delivering tungsten from a to a fuel combustion system or to the exhaust therefrom. By the present invention, tungsten from the lubricant or the fuel will interact with iron from the combustion process. In this manner, the tungsten scavenges or inactivates iron that can otherwise poison catalytic converters, sensors and/or automotive on-board diagnostic devices and/or reduce the operation of spark plugs. The present invention can also lead to improved durability of exhaust after treatment systems. Supplying tungsten acts to change the characteristics of iron deposits formed by combusting a fuel with iron.

6 Claims, No Drawings

SUPPLYING TUNGSTEN TO A COMBUSTION SYSTEM OR COMBUSTION SYSTEM EXHAUST STREAM CONTAINING IRON

FIELD OF THE INVENTION

The present invention relates to an apparatus and method for delivering tungsten from a lubricant or fuel source into a fuel combustion system or to the exhaust therefrom. By the present invention, tungsten from the lubricant will interact with iron resulting from the combustion.

BACKGROUND OF THE INVENTION

A problem exists in fuel combustion systems in which the fuel contains, or acquires, or produces upon combustion, iron. Yet, the use of ferrocene compounds in fuel is known. The iron containing deposits formed from ferrocene produce a conductive coating on the sparkplug surface leading to sparkplug failure. Combusting iron also produces crystals that may form on valve seats, which could lead to several undesirable results. Iron/ferrocene is also a wear agent in internal combustion motors. Iron combustion deposits are also known to foul or inhibit the operation of exhaust system components.

What is needed is a means to reduce deposits, or the characteristics of deposits, on spark plugs, valve seats, exhaust system components, or the like due to the inclusion of iron in a fuel to be combusted. It would be desirable to inhibit, reduce or prevent the deleterious effect of iron in an exhaust stream due to the combustion of iron introduced via a fuel, a lubricant, the air, or other source.

SUMMARY OF THE INVENTION

In accordance with the disclosure, there is provided herein a method of reducing the conductivity of deposits from the combustion of a fuel comprising an iron-containing compound, said method comprising adding a tungsten-containing compound to the fuel. In addition, provided herein is a fuel composition comprising a fuel, ferrocene (in an amount up to about 35 mg iron/liter of fuel), and tungsten.

In an embodiment, the present invention provides a method to inhibit, reduce or prevent the deleterious interaction of iron with components of a combustion system or combustion exhaust system by the introduction to the combustion system or its exhaust stream of an effective amount of tungsten. In addition, provided herein is a lubricant composition comprising a base oil with a minor amount of tungsten.

In another embodiment, the present invention provides a system for adding an effective amount of tungsten to the combustion of a fuel for scavenging iron from the fuel or the combustion products resulting from the combustion of the fuel.

The present invention further relates to methods to improve the durability of an after treatment device for a combustion system, wherein the method includes contacting iron produced by the combustion of a hydrocarbonaceous fuel with tungsten provided by a lubricant in an amount sufficient for the tungsten to interact with iron to thereby reduce the amount of iron contacting the after treatment device.

By "tungsten" herein is meant any tungsten compound, source or material. Therefore, tungsten could be elemental tungsten, organotungsten, tungsten oxide, sulphur-containing organotungsten, sulphur- and phosphorus-free tungsten sources, and the like. By way of further example, the sulphur-containing organotungsten compound may be prepared by a variety of methods. One method would include reacting a sulphur- and phosphorus-free tungsten source with an amino group and one or more sulphur sources. Sulfur-containing tungsten compounds might also be the reaction of a sulphur-free tungsten source with an amino group or a thiuram group and, optionally, a second sulphur source.

Examples of sulfur- and phosphorus-free tungsten sources include tungsten acid, tungsten trioxide, ammonium ortho tungstate, ammonium metal tungstate, ammonium paratungstate, sodium tungstate, potassium tungstate, and tungsten halides.

Still additional tungsten compounds include, without limitation, tungsten hexacarbonyl, tungsten ethoxide, tungsten oxychloride, tungsten pentacarbonyl-N-pentylisonitrile, tungsten silicide, tungsten acid, cyclomatic tungsten compounds, tungsten organoamines, tungsten phosphenes, organo-oxo-tungstenates.

Still additional tungsten compounds may be in the form of nanoalloy tungsten lubricant additive compounds such as, without limitation, $MgWO_4$, $CaWO_4$, $ZnWO_4$, and the like.

The tungsten can be oil-soluble or dispersed or mixed in a lubricant or fuel. Available tungsten-containing compounds, and the production of the same, are illustrated in International Publication Number WO 20071009022, which is hereby incorporated herein it its entirety.

In a lubricant, the tungsten can be present as an oil-soluble additive that can be introduced to the combustion chamber or exhaust stream. For instance, tungsten can be introduced via a lubricant film on a cylinder wall or through a PCV valve (in embodiments where the lubricant is used in an engine). It may also enter the combustion chamber through "bulk" consumption, i.e., past valve guides or around piston rings.

The iron to be scavenged by the tungsten or tungsten-containing compound is any form of iron, iron-containing compound, or iron source without limitation. For instance, iron introduced to, or accumulated in, a lubricant may be the result of engine wear.

By "base oil" herein is meant a base oil which can be selected from the group consisting of paraffinic, naphthenic, aromatic, poly-alpha-olefins, synthetic esters, and polyol esters, and mixtures thereof. In a preferred embodiment, the base oil contains less than or equal to 0.03 wt. % sulfur, and greater than or equal to 90 wt. % saturates, and has a viscosity index greater than or equal to 80 and less than or equal to 120. In another embodiment, the base oil contains less than or equal to 0.03 wt. % sulfur, and greater than or equal to 90 wt. % saturates, and has a viscosity index greater than or equal to 120. In a more preferred embodiment, the base oil is substantially sulfur-free.

By "scavenging" herein is meant the contacting, combining with, reacting, incorporating, chemically bonding with or to, physically bonding with or to, adhering to, agglomerating with, affixing, inactivating, rendering inert, consuming, alloying, gathering, cleansing, consuming, or any other way or means whereby a first material makes a second material unavailable or less available.

By "interaction", "interacting" and "interacts" herein is meant scavenging.

By "inactivating" herein is meant scavenging.

By "hydrocarbonaceous fuel" herein is meant hydrocarbonaceous fuels such as but not limited to diesel fuel, jet fuel, alcohols, ethers, kerosene, low sulfur fuels, synthetic fuels, such as Fischer-Tropsch fuels, fuels produced from at least one gaseous reactant, liquid petroleum gas, fuels derived from coal, genetically engineered biofuels and crops and extracts therefrom, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use in the fuels of the present invention include methanol, ethanol, isopropanol, t-butanol, mixed alcohols, methyl tertiary butyl ether, tertiary amyl methyl ether, ethyl tertiary butyl ether and mixed ethers. Oxygenates, when used, will normally be present in the reformulated gasoline fuel in an amount below about 25% by volume, and preferably in an amount that provides an oxygen content in the overall fuel in the range of about 0.5 to about 5 percent by volume. "Hydrocarbonaceous fuel" or "fuel" herein shall also mean waste or used engine or motor oils which may or may not contain tungsten, gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics and other organic waste and/or by-products, and mixtures thereof and emulsions, suspensions, and dispersions thereof in water, alcohol, or other carrier fluids. By "diesel fuel" herein is meant one or more fuels selected from the group consisting of diesel fuel, biodiesel, biodiesel-derived fuel, synthetic diesel and mixtures thereof. It is preferred that the hydrocarbonaceous fuel is substantially sulfur-free, by which is meant a sulfur content not to exceed on average about 30 ppm of the fuel.

By "combustion system" and "apparatus" herein is meant, for example and not by limitation herein, any diesel-electric hybrid vehicle, a gasoline-electric hybrid vehicle, a two-stroke engine, any and all burners or combustion units, including for example and without limitation herein, stationary burners, waste incinerators, diesel fuel burners, diesel fuel engines, automotive diesel engines, gasoline fuel burners, gasoline fuel engines, power plant generators, and the like. The hydrocarbonaceous fuel combustion systems that may benefit from the present invention include all combustion units, systems, devices, and/or engines that burn fuels. By "combustion system" herein is also meant any and all internal and external combustion devices, machines, engines, turbine engines, jet engines, boilers, incinerators, evaporative burners, plasma burner systems, plasma arc, stationary burners, and the like which can combust or in which can be combusted a hydrocarbonaceous fuel.

By "contacting" herein is meant the contacting, bringing together, reacting, complexing, coordinating, combining, admixing, mixing, and the like association between two or more materials, whether or not a chemical or physical reaction or change occurs.

By "essentially free of phosphorus and compounds thereof" is meant an amount of elemental phosphorus or a compound thereof which is less than about 10 ppm in the lubricant or resulting exhaust stream. Such low levels of phosphorus are desirable in many current lubricant formulations, and it is anticipated that lower levels of phosphorus in lubricants will be continually sought, perhaps required. A preferred level of phosphorus in the lubricant is an amount between 1 ppm and approximately 1500 ppm, A more preferred level of phosphorus in the lubricant is an amount between 500 ppm and 1200 ppm.

By "after treatment system" or "after treatment device" herein is meant any system or device which contacts the combustion product(s) from a combustion chamber in a manner designed to oxidize, reduce or otherwise treat the combustion product(s). The after treatment system may aid combustion or oxidation. Examples, but not by way of limitations herein, of such after treatment systems include an automobile three-way catalytic converter, selective catalytic reduction, lean $NO_x$ traps, catalyzed diesel particulate filter ("C-DPF") and a continuously regenerating technology diesel particulate filter. "After treatment system" also includes associated sensors like $O_2$ sensors and $NO_x$ sensors. Analogous gasoline combustion after treatment systems are known and are included herein as deriving benefit from the present invention.

It is to be understood that both the foregoing general description and the following detailed description are exemplary and explanatory only and are intended to provide further explanation of the present invention, as claimed.

DETAILED DESCRIPTION OF THE PRESENT INVENTION

In a more specific embodiment, the present invention provides a method for reducing the amount of iron in, or the deleterious effect of iron on, combustion systems or combustion exhaust after treatment and control devices, resulting from the combustion of an iron or an iron-containing compound through the use of tungsten. The tungsten can be added to a fuel to be combusted or to a lubricant operable with the combustion system.

Iron compounds and organometallic iron compounds, such as ferrocene, are known for octane enhancement or other benefits (see, eg. U.S. Pat. No. 4,139,349, the disclosure of which is hereby incorporated by reference in its entirety). Ferrocene [$Fe(C_5H_5)_2$] comprises two cyclopentadienyl rings bound on the opposite sides of a central iron atom and forming an organometallic sandwich compound. The iron/ferrocene can be present in a fuel composition in any desired or effective amount. In an aspect, the fuel can be treated with from about 2 mg iron/liter of fuel to about 35 mg iron/liter of fuel, for example from about 5 mg/liter to about 25 mg/liter, and as a further example from about 10 mg/l to about 20 mg/l.

In one embodiment, the method including the steps: (a) lubricating the combustion system with the lubricant comprising a major amount of a base oil of lubricating viscosity and a minor amount of one or more additives comprising a tungsten source; (b) combusting in the combustion system the hydrocarbonaceous fuel to produce combustion products comprising iron and (c) contacting the tungsten with the combustion products (which include iron) whereby the tungsten interacts with the combustion products. In one embodiment, the tungsten contacts the iron in the combustion products, and this interaction between the tungsten and the iron in the combustion products results in the scavenging of the iron, whereby several beneficial results are obtained. The beneficial results include reducing engine or system wear related to the iron, maintaining catalytic converter performance, maintaining sensor performance, maintaining LNT performance, extending the life of a spark plug, reducing conductivity of combustion generated deposits, and maintaining diesel particulate filter (DPF) performance. In another embodiment, the fuel composition can comprise a metallic or organometallic tungsten compound.

When cars are operated with tungsten in the lubricant or fuel, less iron will be deposited on the car's catalytic converter. According to the present invention, less iron is deposited throughout the catalyst when tungsten (W) has been combusted in or with the fuel. Tungsten is combining in the combustion or exhaust stream with iron to form species that do not form impermeable or reduced-permeability glazes on the catalyst. With less impermeable glaze on the catalyst, less emissions can "break through", i.e., pass through as unconverted emissions. Therefore, it is desirable to have W in the combustion and/or exhaust stream.

Thus, the present invention provides a method to inhibit the formation of iron-based, permeability-reducing glazes or crystals on the surface of a catalyst exposed to the products from the combustion in a combustion unit of a fuel, wherein the method includes contacting tungsten with the products of combustion of the fuel, wherein the products contain iron.

The addition of tungsten via the fuel or lubricant also lowers the conductivity of combustion-derived products such as spark plug deposits compared to deposits formed from combustion of fuel treated with ferrocene alone. Reference is made throughout to the term "reduced" in the context of the operation of an engine, a spark plug, or the combustion of a fuel. The term "reduced" means a reduction in the operation of a system relative to the operation of a similar system that has an iron containing compound but does not have a tungsten-containing compound combusted in combination with the iron containing compound or supplied via a lubricant to the combustion process or exhaust stream. "Reduced" operation in this context includes, but is not limited to, the reduction in the number of mis-fires and/or a reduction in the conductivity of the deposits appearing or produced on the spark plugs.

Tungsten or any tungsten-containing compound could be operable with the present invention, including elemental tungsten, organotungsten, sulphur-containing organotingsten, sulphur- and phosphorus-free tungsten sources, and the like. In addition, and without limitation, tungsten oxides, mono-nuclear and di-nuclear and tri-nuclear tungsten sulfonate, tungsten phenate, and the like are available for use. By way of further example, the sulphur-containing organotungsten compound may be prepared by a variety of methods. One method would include reacting a sulphur- and phosphorus-free tungsten source with an amino group and one or more sulphur sources. Sulfur-containing tungsten compounds might also be the reaction of a sulphur-free tungsten source with an amino group or a thiuram group and, optionally, a second sulphur source.

Examples of sulfur- and phosphorus-free tungsten sources include tungsten acid, tungsten trioxide, ammonium ortho tungstate, ammonium metal tungstate, ammonium paratungstate, sodium tungstate, potassium tungstate, and tungsten halides.

Still additional tungsten compounds include, without limitation, tungsten hexacarbonyl, tungsten ethoxide, tungsten oxychloride, tungsten pentacarbonyl-N-pentylisonitrile, tungsten silicide, tungsten acid, cyclomatic tungsten compounds, tungsten organoamines, tungsten phosphenes, organo-oxo-tungstenates.

Still additional tungsten compounds may be in the form of nanoalloy tungsten lubricant additive compounds such as, without limitation, $MgWO_4$, $CaWO_4$, $ZnWO_4$, and the like.

The tungsten can be oil-soluble or dispersed or mixed in a lubricant or fuel. Available tungsten-containing compounds, and the production of the same, are illustrated in International Publication Number WO 2007/009022, which is hereby incorporated herein it its entirety.

When formulating additives to be used in the embodiments of the present invention, the tungsten containing compounds are employed in any desired or effective amount to achieve benefits to the combustion system or combustion exhaust after treatment system. An exemplary treatment rate of the tungsten containing compound can be less than or equal to 36 mg of tungsten/liter of fuel, for example less than 25 mg of tungsten/liter of fuel, and as a further example about 1 to about 20 mg of tungsten/liter of fuel.

Tungsten can be supplied to a lubricant at any treat rate without limitation. In another embodiment, the tungsten in the oil composition is preferably provided in an amount of from about 10 ppm to about 750 ppm, such as 10 ppm to 350 ppm, more preferably from about 30 ppm to about 200 ppm, and still more preferably in an amount of from about 50 ppm to about 100 ppm, based on the total weight of the lubricating composition. Tungsten may be supplied to the fuel, the lubricant (if any), or both compositions.

It should be understood that the iron or iron-containing compounds being scavenged according to the present invention by the tungsten from the lubricant or fuel could originate from the air utilized in the combustion of the hydrocarbonaceous fuel.

In another embodiment, the iron or iron-containing compounds being scavenged according to the present invention by the tungsten can originate from the hydrocarbonaceous fuel.

In yet another embodiment of the present invention, the iron or iron-containing compounds being scavenged by the tungsten can originate from the lubricant used to lubricate the combustion system.

In one embodiment, the lubricant-borne tungsten which will scavenge the contaminant(s) can bleed, "blow-by", flow, seep, be forced or compressed, be drawn, sucked, or aspirated or otherwise accidentally or deliberately get into a combustion chamber of the combustion system. In this embodiment, the contaminant(s) encounter and interact with the tungsten during or after the combustion process, whereby scavenging occurs. Thus an embodiment of a method of the present invention is achieved when lubricant containing tungsten escapes around a valve in the combustion system, such as for example and not as a limitation herein, an intake valve or an exhaust valve in an automotive engine. In this manner, the tungsten is caused to encounter and interact with the contaminant(s), whereby scavenging can occur.

In another embodiment, the tungsten is caused, deliberately or inadvertently, to encounter the contaminant(s) in a passageway through which the combustion products containing the contaminant(s) are conveyed away from the combustion chamber. In this manner, the scavenging occurs outside the combustion chamber of the combustion system.

In another embodiment of the present invention, the tungsten volatilizes from the lubricant and is carried over into the combustion chamber containing the fuel.

In yet another embodiment, the combustion system utilizes a deliberate recirculating process, whereby vapors in a crankcase are recirculated into either the intake manifold or the combustion chamber. In this manner, any lubricant containing iron is caused to encounter and interact with tungsten in the combustion or exhaust.

In one embodiment, the fuel or the exhaust from its combustion is treated with a low level of tungsten, such as for example, a tungsten level of about 20 ppm W in the fuel or combustion exhaust or less.

This invention also achieved catalyst protection and contaminant scavenging when the fuel combusted contains an oil having a tungsten compound, without extra tungsten being delivered to the combustion unit or its exhaust from a lubricant source.

The present invention provides in another embodiment an apparatus for performing a method for reducing the amount of, or deleterious effect on exhaust emissions after treatment and control devices of, iron in an exhaust stream, wherein the apparatus contains (a) a combustion chamber adapted to combust a hydrocarbonaceous fuel, (b) a means to introduce the hydrocarbonaceous fuel into the combustion chamber, (c) a means to convey combustion product from the combustion chamber; (d) a lubricant comprising a major amount of a base oil of lubricating viscosity and a minor amount of at least one tungsten source, and (e) a means to introduce the lubricant to the combustion product. The apparatus can further contain an after treatment device or system.

In another embodiment of the present disclosure there is provided a method enhancing the octane rating (Octane Research Number) of a fuel comprising adding to the fuel (a) a tungsten-containing compound to deliver up to 36 milligrams of tungsten per liter of fuel, and (b) an iron-containing compound to deliver up to 35 milligrams of iron per liter of fuel, whereby the resulting fuel has a Research Octane Number equal to or greater than 6.0, and in another embodiment the RON is greater than 7.0, and in yet another it is greater than 8.0.

In another embodiment of the present invention, there is provided a petroleum additive (for a fuel or lubricant) comprising an iron-containing compound and tungsten (i.e. tungsten or a tungsten source). The components are provided at a ratio of 1:100 iron to tungsten to 100:1 iron to tungsten. Optionally, a petroleum additive as described herein may include deposit inhibitors, detergents, wear inhibitors, lubricity improvers, flow improvers, cold flow improvers, octane enhancers, dispersants, corrosion inhibitors, stabilizers, oxidation preventers, performance additives and the like to increase desirable petroleum properties.

Other embodiments of the present invention will be apparent to those skilled in the art from consideration of the specification, Figures and practice of the invention disclosed herein. It is intended that the specification and Figures be considered as exemplary only, with a true scope and spirit of the invention being indicated by the following claims.

What is claimed is:

1. A fuel composition comprising
   a) a fuel
   b) ferrocene, in an amount of at least about 10 mg iron/liter up to about 35 mg iron/liter of fuel, and
   c) tungsten;
   wherein the undesirable effects on a combustion system when a fuel composition contains iron are reduced by the fuel composition containing both iron and tungsten.

2. The composition of claim 1, wherein the fuel is selected from the group consisting of diesel fuel, biodiesel, biodiesel-derived fuel, synthetic diesel, jet fuel, alcohols, ethers, kerosene, low sulfur fuels, synthetic fuels, Fischer-Tropsch fuels, fuels produced from at least one gaseous reactant, liquid petroleum gas, fuels derived from coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, used engine or motor oils, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

3. The composition of claim 1, wherein the tungsten is present in an amount of from about 1 to about 36 milligrams of tungsten per liter of fuel.

4. A method of enhancing the octane rating (Research Octane Number) of a fuel comprising adding to the fuel a) a tungsten-containing compound to deliver up to 36 milligrams of tungsten per liter of fuel, and b) an iron-containing compound to deliver up to 35 milligrams of iron per liter of fuel, whereby the resulting fuel has a Research Octane Number increase equal to or greater than 6.0; as compared with unadditized fuel.

5. The method of claim 4, wherein the resulting fuel has a Research Octane Number increase equal to or greater than 7.0.

6. The method of claim 4, wherein the resulting fuel has a Research Octane Number increase equal to or greater than 8.0.

* * * * *